Patented July 5, 1949

2,475,334

UNITED STATES PATENT OFFICE 2,475,334

GAS PURIFICATION PROCESS

Carl S. Oldach, Charleston, W. Va., assignor to E. I. du Pont de Nemours & Company, Wilmington, Del., a corporation of Delaware No Drawing. Application April 22, 1944, Serial No. 532,375

10 Claims. (Cl. 23—2)

This invention relates to a process for the separation of contaminating constituents from industrial gases and more particularly to separating carbon dioxide, hydrogen sulfide, carbonyl sulfide, carbon disulfide, and organic sulfur compounds from industrial gases by absorption of these contaminants in or by an organic amine.

Industrial gases usually contain acidic contaminants which make them unfit for use in many chemical processes. This is particularly true when such gases are used in chemical processes involving the use of catalysts, as the sulfur-containing ingredients poison the catalysts. A number of methods have been proposed for removing these contaminating substances, and perhaps most widely used are scrubbing methods involving the employment of various scrubbing fluids which remove the contaminants either by solution, mechanical entrapment, or by chemical action with the scrubbing constituent.

By and large, these methods involve scrubbing the contaminated gas at or about room temperature to effect the separation of the contaminants, thereafter heating the scrubbing fluid to remove the absorbed contaminating constituents and recycling the regenerated scrubbing fluid. Such methods usually involve the heating and cooling of all of the scrubbing medium employed, and as it is used in excess, a major fraction of the heat transfer load is directly attributable to the heating and cooling of the scrubbing liquid.

An object of the present invention is to provide an improved method for separating contaminants from industrial gases. Another object is to provide a method for scrubbing industrial gases that contain carbon dioxide, hydrogen sulfide, carbonyl sulfide, carbon disulfide, or organic sulfur compounds with an oil solution or suspension of an organic amine. A further object is to provide a method wherein such gases are scrubbed with an oil solution of an organic amine which is not only soluble in the oil under the temperatures at which the scrubbing is effected, but also insoluble in the oil after the amine has combined with or absorbed the contaminants from the gas. Yet another object is to provide a method of using the scrubbing medium described in the last object wherein the precipitated organic amine is separated from the large volume of the scrubbing medium, regenerated, and recycled. A further object is to provide a method wherein industrial gases are scrubbed with an oil containing an amine which method differs from the objects presented above only in that the amine remains liquid and incompletely miscible in the oil both before and after scrubbing impurities from the gases. Other objects and advantages of the invention will hereinafter appear.

Broadly, the invention involves the use of a homogenous or heterogeneous scrubbing fluid containing an organic amine and a carrier therefor. The fluid is brought into intimate contact with the gas to be decontaminated, whereupon the organic amine removes the contaminants. The spent scrubbing fluid is treated for the separation of the contained organic amine from the carrier, the organic amine regenerated to free it from the contaminants, and then recombined with the carrier for recycling.

It has been found, in accord with one feature of the invention, that certain organic amines which are soluble in oils become insoluble therein when they have combined with the contaminants present in industrial gases. When an industrial gas is scrubbed with such an amine, the insolubilized amine settles as a flocculent precipitate from the oil and may be partially separated therefrom by decantation. The precipitate may then be subjected to regeneration by heating or chemical treatment to free it from the absorbed or chemically combined contaminants which have been extracted from the scrubbed gases. After the contaminants are thus driven from the amine, it is redissolved in oil and recycled through the system.

Another feature of the invention involves the use of a dispersion of an oil-insoluble organic amine in an oil to scrub the contaminated gases. The spent dispersion is taken from the base of the scrubber and permitted to separate by decantation, the oil layer being recycled directly to the scrubber and the liquid amine layer being regenerated, redispersed in the scrubbing oil and recycled to the scrubber.

It is evident that the many disadvantages inherent in the scrubbing processes of the art are avoided by these methods, for it is not necessary to heat all of the scrubbing liquid to remove the absorbed contaminants, but only necessary to heat the portion of the scrubbing liquid which contains the extracted contaminants, namely, the organic amine. The heat load, therefore, which is the major expense incurred in the use of a scrubbing method of this type, is greatly reduced, with the concurrent reduction in the cost of purifying the industrial gas. The use of a suitable low viscosity hydrocarbon oil as solvent greatly increases the speed of absorption of the common contaminants in industrial gases over that obtained in aqueous systems, thus making feasible the use of much smaller scrubbing equipment.

Any suitable organic amine may be employed in this improved method, providing the amine has the following characteristics: First, it should preferably be soluble in a hydrocarbon oil to the extent of at least 1%, or at least to the extent that a solution or dispersion of the organic amine in the oil has such a capacity for absorbing impurities from a gas that one volume of the scrubbing liquid can purify one or more volumes of gas, measured at standard temperature and pressure. Second, the organic amine should form with the contaminants, i. e. with either the carbon dioxide, hydrogen sulfide, carbonyl sulfide, carbon disulfide, or organic sulfur present, a precipitate which is insoluble in the oil. (This is not necessary if a dispersion of the amine in the oil is used.) Third, the precipitate should form at the temperature at which the scrubbing operation is conducted (also not a requirement for the second feature of the invention). Fourth, the precipitated product must be capable of being regenerated, preferably by heating.

As examples of the organic amines that may be used in accord with the first feature of the invention, there are included both straight chain and cyclic hydrocarbon groups, containing one or more amine groups, in which there are 3 or more carbon atoms for each amine group, such as butylamine, triethylene diamine, piperidine, dipiperidyl dodecahydrocarbazole, n-ethyl carbazole, lauryl amine, di-2-ethylhexylamine, mono-, di-, and triamyl amines, and similar amines as defined above. In addition, other types of amines fulfill the requirements such as morpholine, alkyl aminophenols such as monoethyl-, monobutyl-, monoamyl-, dibutyl-, and diamyl-, para aminophenol and the like, tetramethyl diamino isopropanol ethyl ether, and other large hydrocarbon molecules containing oxygen groups as well as amine groups.

These absorbents, as well as those described below for the second feature of the invention, may be used for scrubbing natural or synthetic gas mixtures such, for example, as coke oven gas, blue gas, natural gas, water gas, and gaseous mixtures generally that contain the above designated or other contaminants.

The organic amines described above or below are dissolved or dispersed in a suitable hydrocarbon oil, such, for example, as oils frequently used for scrubbing operations having a relatively low viscosity and high boiling point and known as "absorbent" or "straw" oils, and more particularly petroleum fractions falling in the following limits: boiling point range from 150 to 500° C., viscosity at 25° C. from 0.7 to 30 centipoise, the optimum properties being lowest possible viscosity with highest possible boiling point. The concentration of the amine in the oil is not critical to the operation of the process, since only the spent portion of the amine need by separated and regenerated, the oil and excess amine being recirculated without any treatment. The preferred concentration in each case is determined by the properties of the spent scrubbing mixture, particularly as regards flow and decanting characteristics.

The scrubbing of the industrial gas with the oil solution or dispersion of the organic amine is, in general, conducted at a temperature ranging between about 0° and 80° C., and the precipitate or separated organic amine containing the loosely held contaminants on or in the organic amine is regenerated by heating at a temperature between about 70 to 200° C. The regeneration may, if desired, be carried out under pressure, so as to permit the use of higher temperatures and correspondingly higher rates of regeneration without undue volatilization of the amine or solvent.

The process may be conducted in any suitable type of equipment well known to the art; for example, the oil solution or dispersion of the organic amine may be sprayed into the top of a suitable tower and the industrial gas, introduced into a lower portion of the tower, passed upwardly countercurrent to the falling stream of the oil solution of the organic amine. The spent scrubbing fluid may be collected in a pot at the bottom of the tower, from which the scrubbing liquid is passed intermittently or continuously into a decanter wherein the precipitate or dispersion is allowed to settle, the supernatant liquid being returned to the scrubber. Additional amine may be added to the supernatant liquid at this point to combine with any carbon dioxide or sulfur compounds dissolved in the oil so that the supernatant liquid recycled to the scrubber is completely freed of any of the above-mentioned volatile impurities. The precipitate or liquid dispersion is passed into a vessel wherein it is heated to regenerate the amine and separate it from the absorbed or chemically combined contaminants which, being volatile, pass off overhead. The amine is then redissolved or redispersed in oil and recycled to the process.

The table illustrates the absorption capacities of typical amine-oil scrubbing liquids that form precipitates. The concentrations used are not necessarily optimum but are, rather, indicative of the performance of oil solutions of amines for absorbing some of the most common gas contaminants.

Table

| Absorbent "#30 White Oil" | #1 15% Lauryl Amine 85% | | #2 5% Dodecahydrocarbazole 95% | | #3 10% Piperidine 90% | |
|---|---|---|---|---|---|---|
| | Temp., °C. | Capacity [1] | Temp., °C. | Capacity [1] | Temp., °C. | Capacity [1] |
| $CO_2$ Absorption | 28 | 15.3 | 30 | 5.1 | 27 | 13 |
| COS Absorption | 28 | 9.3 | 29 | 13.9 | 27 | 13 |
| $CS_2$ Absorption | 28 | 18.6 | 28 | 30 | 27 | 3.0 |
| $H_2S$ Absorption | 28 | 33 | 28 | 9.3 | | |

[1] Volume of pure gas absorbed per volume of solution at 1 atmosphere partial pressure and temperature indicated.

An example is given illustrating a preferred embodiment of the invention, wherein parts are by weight unless otherwise indicated:

*Example.*—A spray type scrubbing column 14 ft. high and 3 ft. in diameter, in which the gas is purified by passing upwards countercurrent to a spray of oil-amine solution, for example, the No. 1 liquid of the table. The slurry of solution and precipitated amine which collects at the bottom is pumped to a decanting vessel from which the supernatant oil is recycled and a concentrated slurry, 75%, is dropped into a heated tank in which the amine complex is decomposed by heating to 170° C., the amine being separated from the gas liberated. The regenerated lauryl amine is then mixed with the recycled oil to give approximately a 15% solution thereof, and the thus fortified solution is sprayed into the top of the scrubbing column. The regenerating vessel consists of a horizontal tank about 3 ft. in diameter and 20 ft. long, filled with horizontal tubes heated with high pressure steam on the inside. The slurry to be regenerated is allowed to flow by gravity from the decanting tank into one end of the horizontal regenerating tank. The slurry is heated to 170° as it passes through the regenerator, releasing the absorbed impurities which pass overhead as a gas, the amine being completely regenerated by the time it reaches the other end of the regenerator. If desired, scrubbing operations, as illustrated in the example or as conducted by a dispersion of the amine in an oil, can be conducted under a pressure ranging from 2 to 50 atms. and a temperature of from 0 to 80° C., and the regeneration of the fluid or precipitated amine conducted at pressures from 1 to 30 atms. and a temperature ranging from 70 to 200° C.

Scrubbing a typical producer gas containing about 7% $CO_2$, 50 grains sulfur per 100 cubic feet as $H_2S$, and 6 grains of sulfur per 100 cubic feet as organic sulfur, a purified gas containing less than 0.1% $CO_2$ and less than 0.01 grain of sulfur per 100 cu. ft. can be obtained when scrubbing the gas with 70 gallons of a Tillet fluid per 1,000 cu. ft. of gas through.

The alternate feature of the invention, involving the use of a dispersion of the amine in an oil, permits easy separation of the chemically active absorbent from the oil prior to regeneration. In accord with this feature, the liquid amine is not completely miscible with the hydrocarbon oil solvent but forms a two-phase liquid mixture therewith, which mixture is subsequently brought into contact with the gases to be purified. The impurities in the gas simultaneously dissolve in the oil and the amine, but during its passage through the gas contacting unit the impurities are continuously removed from the oil phase by the amine so that the oil does not become saturated with the impurities in the gas being purified. The amine remains liquid and immiscible with the oil even after absorption of the gaseous impurities, so the two-phase liquid mixture leaving the gas contacting unit can be separated into two parts by decantation, the oil layer, which is recycled, and the amine layer, which contains all the absorbed impurities being regenerated by heating prior to recycling.

This feature of the process has the improvement of using an oil medium as the major phase for contacting a gas to be purified, but having in addition a second smaller amine phase which acts as a reservoir in which a high concentration of the contaminants can be stored. This amine phase being immiscible with the oil phase can be readily separated by decantation and regenerated by heating, allowing the major portion of the scrubbing mixture to be recycled without costly regeneration.

Examples of amines suitable for this feature of the invention include in general alkanolamines, such as monoethanol-, diethanol-, and triethanolamine; also diaminoisopropanol, and similar amino alcohols. In addition, both straight chain and cyclic hydrocarbons containing less than 4 carbon atoms per amine group, such as diethylene triamine, triethylene tetramine, tetraethylene pentamine, dipropyl aminoethylamine, ethylenediamine, carbazole, and similar amines may be used, as well as various oxygenated amine compounds such as 3-aminopropyl ether, potassium aminoacetate, p-aminomorpholine, and others.

The type of equipment used for contacting the gas and liquid may be any of the commonly employed gas scrubbing units such as bubble plate columns, sieve plate columns, packed columns, or spray columns. In this case, a bubble plate column is preferred, since it gives longer liquid hold-up and good agitation of the scrubbing liquid.

An oil similar to the one previously described is preferred, and the same auxiliary equipment is applicable. Similar capacities and performances to those indicated above are realized.

Inasmuch as the total concentration of the organic amine employed is usually less than 15%, it is self-evident that if the amine is separated from the oil and regenerated, the sensible heat required for this regeneration would be about 15% of that required for subjecting all of the oil solution to regeneration. In general, the heat of decomposition of the amine precipitate is relatively small, so that a better than 85% heat saving is not unusual when scrubbing in accord with this process.

I claim:

1. A process for the separation of contaminants from industrial gases which comprises scrubbing a contaminated industrial gas with a mixture of an aliphatic amine and an oil in the form of a dispersion, said amine being substantially immiscible in said oil, and forming, with the sulfur impurities in said gas, compounds soluble in said amine, said amine being present in quantities sufficient to maintain said compounds absorbed in solution, removing the spent oil and amine dispersion from the scrubbing operation, permitting the dispersed amine to separate into a liquid phase layer containing said compounds, decanting said layer, regenerating the amine, redispersing the regenerated amine in oil and then recycling the resulting oil dispersion of the amine.

2. The process of claim 1 in which the scrubbing is conducted at a temperature between 0 and 50° C.

3. The process of claim 1 in which the regeneration of the liquid amine layer is conducted at a temperature between 70 and 200° C.

4. The process of claim 1 in which the scrubbing operation is conducted at a pressure between 2 and 50 atmospheres.

5. The process of claim 1 in which regeneration is conducted at a pressure between 1 and 30 atmospheres.

6. A process for separating carbon- and sulfur- containing compounds from gases contaminated therewith, which comprises scrubbing the contaminated gases with a mixture of an aliphatic amine and an oil in the form of a dispersion, said amine being substantially immiscible in said oil, and forming, with the sulfur impurities in said gas, compounds soluble in said amine, said amine being present in quantities sufficient to maintain said compounds absorbed and in solution, removing the spent oil and amine dispersion from the scrubbing operation, permitting the dispersed amine to separate into a liquid phase layer containing said compound, separating the liquid layers, regenerating the amine layer and recycling the amine after redispersing it in oil.

7. The process of claim 6 in which the amine is an alkanol amine.

8. The process of claim 6, in which the scrubbing is conducted at a temperature between 0 and 50° C.

9. The process of claim 6 in which the regeneration is conducted at a temperature between 70 and 200° C.

10. The process of claim 9 conducted under a pressure between 1 and 30 atmospheres.

CARL S. OLDACH.

REFERENCES CITED

The following references are of record in the file of this patent:

UNITED STATES PATENTS

| Number | Name | Date |
| --- | --- | --- |
| 1,882,289 | Lush | Oct. 11, 1932 |